US011664981B2

(12) United States Patent
El-Moussa et al.

(10) Patent No.: US 11,664,981 B2
(45) Date of Patent: May 30, 2023

(54) IMPEDING DATA ACCESS

(71) Applicant: British Telecommunications Public Limited Company, London (GB)

(72) Inventors: Fadi El-Moussa, London (GB); Fabio Giubilo, London (GB)

(73) Assignee: British Telecommunications Public Limited Company, London (GB)

( * ) Notice: Subject to any disclaimer, the term of this patent is extended or adjusted under 35 U.S.C. 154(b) by 402 days.

(21) Appl. No.: 16/738,140

(22) Filed: Jan. 9, 2020

(65) Prior Publication Data

US 2020/0220714 A1    Jul. 9, 2020

(30) Foreign Application Priority Data

Jan. 9, 2019   (EP) ..................................... 19150868

(51) Int. Cl.
*H04L 9/08*         (2006.01)
*H04L 9/06*         (2006.01)
(Continued)

(52) U.S. Cl.
CPC ............ *H04L 9/085* (2013.01); *H04L 9/0643* (2013.01); *H04L 63/0428* (2013.01);
(Continued)

(58) Field of Classification Search
CPC ... G06F 21/606; G06F 21/62; H04L 2209/16; H04L 2209/34; H04L 63/0428;
(Continued)

(56) References Cited

U.S. PATENT DOCUMENTS 5,757,913 A *   5/1998   Bellare ................. H04L 9/3297
                                                  713/168
7,801,306 B2 *  9/2010   Reitmeier .......... H04N 21/8358
                                                  380/240
(Continued)

FOREIGN PATENT DOCUMENTS

EP          1193666 A1    4/2002
EP          1193666 B1    6/2006
(Continued)

OTHER PUBLICATIONS

Search Query Report from IP.com (performed Apr. 21, 2021) (Year: 2021).*

(Continued)

*Primary Examiner* — Sharon S Lynch
(74) *Attorney, Agent, or Firm* — Patterson Thuente, P.A.

(57) ABSTRACT

A computer implemented method of protecting data in a message for communication from a sender to a receiver, the sender and receiver sharing a secret, the method including splitting the message into a plurality of ordered message blocks, the order being a proper order such that an aggregation of the blocks in the proper order constitutes the message; generating a hash value for each message block, each hash value being generated on the basis of at least a content of the block and the secret; generating, for each block, an encoded indication of a position of the block in the proper order of blocks, the encoding being reversible and based on at least the hash value for the block and a position of the block in the proper order; communicating the blocks to the receiver in an order different to the proper order so as to obfuscate the message; and communicating the encoded indications to the receiver such that the blocks can be reassembled by the receiver in the proper order on the basis of the shared secret.

9 Claims, 5 Drawing Sheets

(51) Int. Cl.
*H04W 12/033* (2021.01)
*H04L 9/40* (2022.01)

(52) U.S. Cl.
CPC ....... *H04W 12/033* (2021.01); *H04L 2209/16* (2013.01); *H04L 2209/34* (2013.01)

(58) Field of Classification Search
CPC ..... H04L 9/0643; H04L 9/085; H04L 9/3242; H04W 12/033
See application file for complete search history.

(56) References Cited

U.S. PATENT DOCUMENTS

| | | | |
|---|---|---|---|
| 8,879,727 B2* | 11/2014 | Taylor | H04L 9/0819 380/42 |
| 9,311,494 B2 | 4/2016 | Fujii et al. | |
| 9,537,650 B2 | 1/2017 | Auradkar et al. | |
| 9,635,011 B1* | 4/2017 | Wu | H04L 63/0807 |
| 9,985,780 B2* | 5/2018 | Yamada | H04L 9/0643 |
| 10,021,085 B1* | 7/2018 | Wu | H04L 63/0428 |
| 10,313,231 B1* | 6/2019 | Bosshart | H04L 45/44 |
| 10,348,693 B2 | 7/2019 | Auradkar et al. | |
| 10,521,612 B2* | 12/2019 | Arad | G06F 21/6254 |
| 10,892,921 B2* | 1/2021 | Nagata | H04L 9/14 |
| 2001/0021254 A1* | 9/2001 | Furuya | H04L 9/0625 380/259 |
| 2002/0152218 A1* | 10/2002 | Moulton | G06F 16/137 |
| 2009/0041235 A1* | 2/2009 | Reitmeier | H04N 21/8358 380/42 |
| 2009/0060197 A1* | 3/2009 | Taylor | H04L 9/0861 380/29 |
| 2009/0265397 A1* | 10/2009 | Williams | G06F 13/385 |
| 2010/0189257 A1* | 7/2010 | Bjorkengren | H04N 21/42623 380/268 |
| 2010/0303229 A1* | 12/2010 | Unruh | H04L 9/0643 380/28 |
| 2011/0145593 A1 | 6/2011 | Auradkar et al. | |
| 2012/0082310 A1* | 4/2012 | Rashkovskiy | H04N 21/2347 380/255 |
| 2012/0147988 A1* | 6/2012 | Neeman | H03M 13/2957 375/295 |
| 2012/0221854 A1* | 8/2012 | Orsini | H04L 9/3226 713/167 |
| 2012/0222134 A1* | 8/2012 | Orsini | G06F 16/22 726/28 |
| 2012/0226904 A1* | 9/2012 | Orsini | H04L 63/0823 713/167 |
| 2012/0255034 A1* | 10/2012 | Orsini | H04L 63/0823 726/28 |
| 2012/0255035 A1* | 10/2012 | Orsini | H04L 63/0428 726/28 |
| 2013/0024933 A1* | 1/2013 | Jakobsson | G06F 21/567 726/22 |
| 2013/0067225 A1* | 3/2013 | Shochet | H04L 9/0662 713/165 |
| 2013/0232578 A1* | 9/2013 | Chevallier-Mames | G06F 21/10 726/26 |
| 2013/0276074 A1* | 10/2013 | Orsini | G06F 21/62 726/5 |
| 2014/0331044 A1 | 11/2014 | Fujii et al. | |
| 2015/0381582 A1* | 12/2015 | O'Hare | H04L 63/0876 713/189 |
| 2018/0240191 A1 | 8/2018 | Aronson | |
| 2018/0367509 A1* | 12/2018 | O'Hare | H04L 67/108 |
| 2018/0373885 A1* | 12/2018 | Arad | G06F 21/6254 |
| 2019/0007390 A1* | 1/2019 | Wu | H04L 63/0807 |
| 2019/0132162 A1* | 5/2019 | Nagata | H04L 9/14 |
| 2019/0273781 A1 | 9/2019 | Daniel | |
| 2020/0153813 A1* | 5/2020 | Wu | H04L 9/3297 |
| 2020/0204197 A1* | 6/2020 | Maunder | H03M 13/6356 |
| 2021/0194800 A1* | 6/2021 | Bosshart | H04L 69/325 |
| 2021/0211271 A1* | 7/2021 | Kuang | H04L 9/3239 |

FOREIGN PATENT DOCUMENTS

| | | |
|---|---|---|
| EP | 2392097 A1 | 12/2011 |
| EP | 2584732 A1 | 4/2013 |
| EP | 2584732 B1 | 10/2019 |
| WO | WO-2016073148 A1 | 5/2016 |

OTHER PUBLICATIONS

Search Query Report from IP.com (performed Jan. 27, 2022) (Year: 2022).*
Search Query Report from IP.com (performed Aug. 10, 2022) (Year: 2022).*
Search Query Report from IP.com (performed Dec. 21, 2022) (Year: 2022).*
Combination Search and Examination Report under Sections 17 & 18(3) for Great Britain Application No. 1900270.8, dated Jun. 7, 2019, 6 pages.
Extended European Search Report for European Application No. 19150868.8, dated Jul. 9, 2019, 5 pages.
Extended European Search Report for European Application No. 19217451.4, dated Apr. 30, 2020, 6 pages.
Xiao et al., A Hybrid Scheme for Fine-Grained Search and Access Authorization in Fog Computing Environment, Apr. 6, 2017, Sensors, Sensors 2017, 17, 1423, pp. 1-22. (Year: 2017).
Bosch, C., "A Survey of Provably Secure Searchable Encryption", 2014, 51 pages.
Combined search and Examination Report for Great Britain Application No. 1900271.6, dated Jun. 7, 2019, 6 pages.
Curtmol R., et al., "Searchable Symmetric Encryption: Improved Definitions and Efficient Constructions," 2006, 33 pages.
Extended European Search Report for Application No. 19150865.4, dated Jul. 12, 2019, 8 pages.
Extended European Search Report for Application No. EP19160215.0, dated Jul. 22, 2019, 5 pages.
Girme M R., et al., "Efficient Secure Ranked Keyword Search Algorithms Over Outsource Cloud Data," Sep.-Oct. 2013, 5 pages.
Golle P., et al., "Secure Conjunctive Keyword Search Over Encrypted Data", 2004, 15 pages.
Hwang Y H., et al., "Public Key Encryption with Conjunctive Keyword Search and its Extension to a Multi-User System," 2007, 19 pages.
International Preliminary Report on Patentability for Application No. PCT/EP2019/085937, dated Jul. 22, 2021, 8 pages.
International Search Report and Written Opinion for Application No. PCT/EP2019/085937, dated Jan. 31, 2020, 13 pages.
Kamara S., et al., "Dynamic Searchable Symmetric Encryption," 2012, 24 pages.
Li et al., "Fuzzy Keyword Search over Encrypted Data in Cloud Computing," 2010, 5 pages.
Li et al., "Security Analysis on One-to-Many Order Preserving Encryption BasedCloud Data Search," 2015, vol. 10, No. 9, 9 pages.
Liesdonk P V., et al., "Computationally Efficient Searchable Symmetric Encryption," 2010, 14 pages.
Pastoriza T., et al., "Privacy-Preserving Error Resilient DNA Searching through Oblivious Automata," 2007, 10 pages.
Popa R.A., et al., "Multi-key Searchable Encryption," 2013, 18 pages.
Song, "Computationally Efficient Searchable Symmetric Encryption", 2010, 178 pages.
Song X., et al., "Forward Private Searchable Symmetric Encryption with Optimized 110Efficiency," Sep. 30, 2017, 15 pages.
Tahir S., et al.,"A Ranked Searchable Encryption Scheme for Encrypted DataHosted on the Public Cloud," IEEE, 2017, 6 pages.
Tang Q., "Nothing is for Free: Security in Searching Shared & EncryptedData," 2014, 13 pages.
Wang B., et al. "Geometric Range Search on Encrypted Spatial Data," Apr. 2016, 16 pages.
Wang C., et al., "Enabling Secure and Efficient Ranked Keyword Search OverOutsourced Cloud Data," Aug. 2012, 13 pages.

(56) References Cited

OTHER PUBLICATIONS

Wang C., et al., "Secure Ranked Keyword Search over Encrypted Cloud Data," 2010, 10 pages.

* cited by examiner

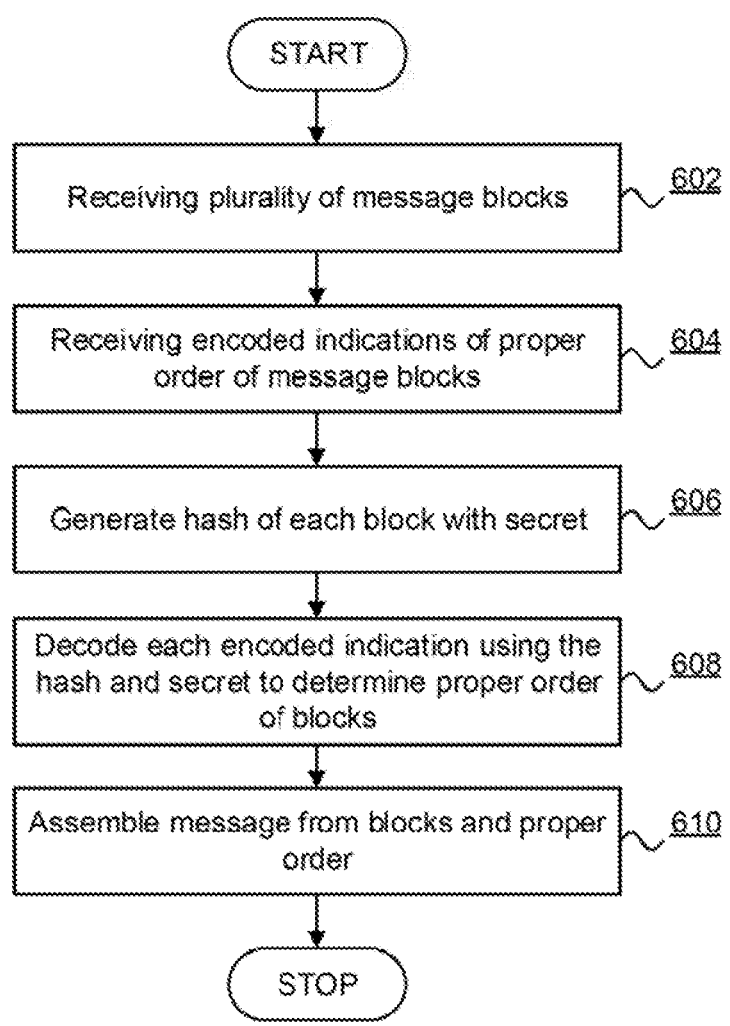

US 11,664,981 B2

IMPEDING DATA ACCESS

CROSS-REFERENCE TO RELATED APPLICATION

The present application claims priority to EP Application No. 19150868.8 filed Jan. 9, 2019, which is hereby incorporated in its entirety by reference.

TECHNICAL FIELD

The present disclosure relates to impeding access to data. In particular, it relates to impeding access to data from high volume data sources.

BACKGROUND

A volume of data generated by devices and appliances and communicated and/or received via networks is large and increasing. Such devices and appliances can include, for example and inter alia: domestic appliances; entertainment devices; physical or virtualised computer systems; telephony devices; personal portable equipment; health and/or exercise devices; sensors; switches; medical devices; fittings and furnishings; meters; security systems; cameras; alarms; smart city devices; monitors; environmental monitors and/or sensors; vehicles; wearable devices; smart clothing; industrial devices and appliances; manufacturing components and/or appliances; and many existing, conceived and/or as yet unrealized devices capable of generating and communicating and/or receiving data. In particular, devices constituting the so-called "internet of things" (IoT) may generate and communicate and/or receive data over a computer network by communication medium such as wired or wireless broadcast, network or the like.

Data generated and communicated by or to such devices can include sensitive information or information that, when combined with other information, could constitute sensitive, secret, personal or private information. Notably, such information is frequently communicated in plaintext or unencrypted form due to constraints on the computational ability and resources of devices involved in the generation, communication or receipt/consumption of the information.

For example, information about a person can be communicated in unencrypted form by devices used by, detecting or otherwise affected by the person. Such information can include, inter alia: location information; travel information; health information such as heart rate, blood pressure and the like; time information such as time and/or date; personal tastes and preferences such as music preferences; and other information. Plaintext disclosure or observation and recording of any one piece of such information may be considered relatively innocuous for the person concerned, especially in the absence of a direct association between the information and the person such as by an identification of the person. However, a simple aggregation of two or more pieces of information can build an impression, picture or data structure of information concerning the person having a sensitivity greater than a sensitivity of any single piece of data taken alone. In effect, the sensitivity of an aggregate of pieces of information is greater than the sensitivity of its parts.

The protection of information by encryption can alleviate privacy concerns, but many IoT and similar devices are not computationally capable of performing cryptographic key generation, hashing and encryption/decryption functions with sufficient performance for the volume of data involved due to resource constraints of the devices. In particular, the resources required to implement and use Elliptic-curve cryptography (ECC) for timely public-key cryptography can exceed the computational ability of many, for example low-cost, IoT devices.

SUMMARY

Thus, there is a challenge to protect data in resource constrained systems.

The present disclosure accordingly provides, in a first aspect, a computer implemented method of protecting data in a message for communication from a sender to a receiver, the sender and receiver sharing a secret, the method comprising: splitting the message into a plurality of ordered message blocks, the order being a proper order such that an aggregation of the blocks in the proper order constitutes the message; generating a hash value for each message block, each hash value being generated on the basis of at least a content of the block and the secret; generating, for each block, an encoded indication of a position of the block in the proper order of blocks, the encoding being reversible and based on at least the hash value for the block and a position of the block in the proper order; communicating the blocks to the receiver in an order different to the proper order so as to obfuscate the message; and communicating the encoded indications to the receiver such that the blocks can be reassembled by the receiver in the proper order on the basis of the shared secret.

In some embodiments, the method further comprises reordering the blocks to constitute a shuffled message, the reordering being performed on the basis of a mathematical property of the hash values, the property being shared between the sender and receiver, wherein communicating the encoded indications to the receiver includes spreading the encoded indications across the blocks in the shuffled message such that communicating the blocks to the receiver includes communicating the encoded indications to the receiver, and such that the encoded indications are extractable by the receiver by a reassembly of the shuffled message using the mathematical property to determine the proper order of blocks.

In some embodiments, each of the encoded indications is reversible on the basis of the shared secret by an exclusive-OR operation of the encoded indication and a hash of a value based on the shared secret.

In some embodiments, the encoded indications are communicated by aggregating an indication to each of the blocks as communicated.

The present disclosure accordingly provides, in a second aspect, a computer implemented method of protecting data in a message communicated from a sender to a receiver, the sender and receiver sharing a secret, the method comprising: receiving the message as a plurality of message blocks such that an aggregation of the blocks in a proper order constitutes the message, wherein the message blocks are received in an order different to the proper order; receiving an encoded indication for each block of a position of the block in the proper order, the encoding being reversible and based on at least a hash value for the block and the shared secret and a position of the block in the proper order; reconstituting the message by determining the proper order of the message blocks by: generating a hash value for each message block, each hash value being generated on the basis of at least a content of the block and the secret; and determining the proper order of the blocks by decoding each of the encoded indications based on the hash value for each block and the secret so as to reconstitute the message.

In some embodiments, the method further comprises assembling a shuffled version of the message by ordering the blocks on the basis of a mathematical property of the hash values, the property being shared between the sender and receiver, and wherein receiving the encoded indications includes extracting each of the encoded indications from the blocks in an order according to the order of the blocks in the shuffled message, the position of an encoded indication in the ordered indications serving to identify a block associated with the indication for hashing in order to retrieve the block's position from the encoded indication in the proper order.

In some embodiments, each of the encoded indications is reversible on the basis of the shared secret by an exclusive-OR operation of the encoded indication and a hash of a value based on the shared secret.

The present disclosure accordingly provides, in a third aspect, a computer system including a processor and memory storing computer program code for performing the method set out above.

The present disclosure accordingly provides, in a fourth aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 6 is a method of a receiver entity for protecting data in a message for communication from a sender to the receiver entity.

DETAILED DESCRIPTION

Embodiments of the present disclosure recognize that large volumes of data can be protected by relatively less secure data protection mechanisms dissuading data access since, in spite of a relatively low computation effort required to access an item of data protected by such relatively less secure data protection mechanisms, the sheer volume of occasions when such computation effort is required to be performed to access many such data items is large by virtue of the sheer quantity of data items. Accordingly, embodiments of the present disclosure provide mechanisms for impeding access to data such that greater effort is required than mere reading plaintext data while providing that such mechanisms are operable by resource constrained devices such as low-resource IoT devices and the like. Thus, where an entity interested in "snooping" data communicated by, to or between IoT devices would readily access (and potentially process and/or store) intercepted plaintext data in real-time, a burden introduced by, for example, a computational exercise required before any such intercepted data can fully accessed, serves to protect the data due to the sheer volume of such data.

Embodiments of the present disclosure provide a computation challenge for accessing such data by partitioning the data and rearranging it. The whole content of an original data item is retained but it is partitioned and disorganized. The complexity of the partitioning and rearranging is adaptable in dependence on capabilities of device generating or receiving the data.

Figure 1:
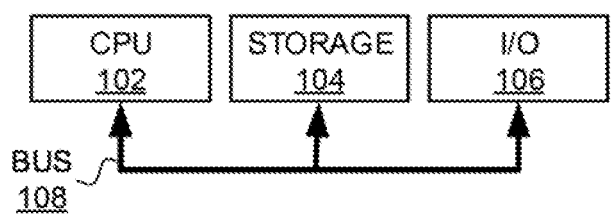
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
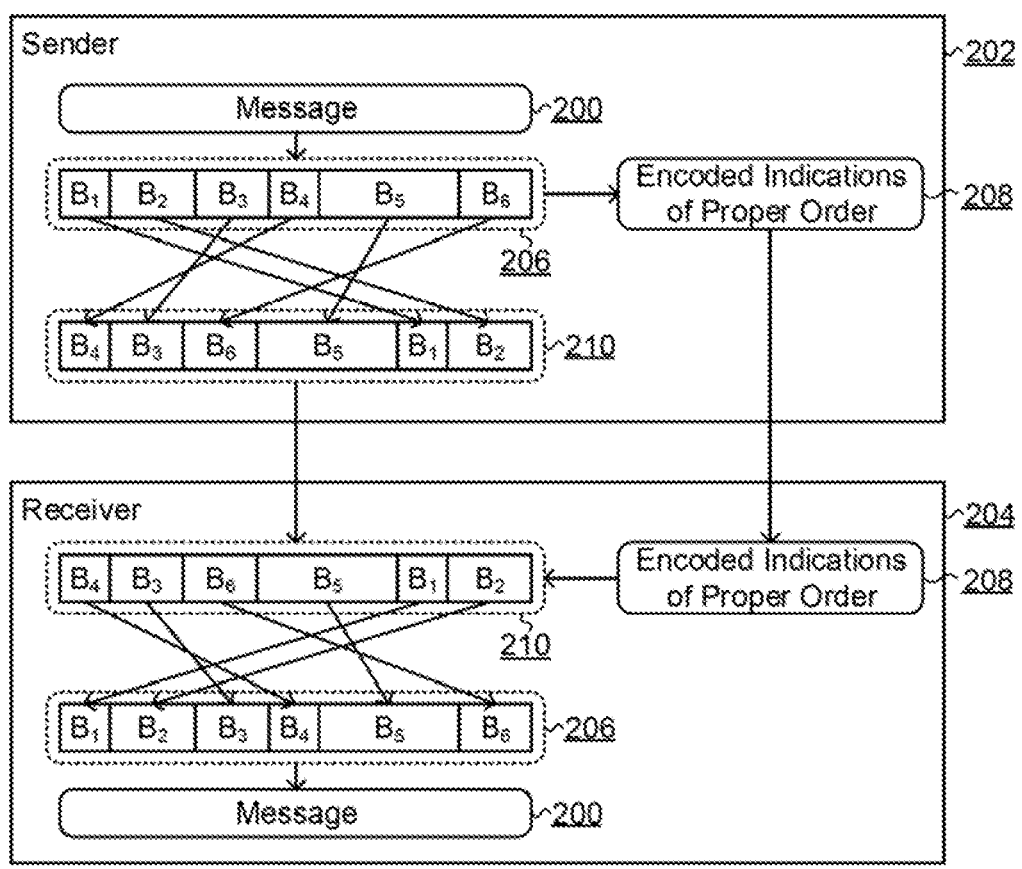
FIG. 2 is a component diagram depicting an arrangement of sender and receiver entities for the communication of a message therebetween in accordance with embodiments of the present disclosure.

FIG. 2 is a component diagram depicting an arrangement of sender 202 and receiver 204 entities for the communication of a message 200 therebetween in accordance with embodiments of the present disclosure. Each of the sender 202 and receiver 204 entities can be any hardware, software, firmware, physical and/or virtualized device, appliance, apparatus or system for the communication of messages therebetween. Communication can take place using any suitable means such as a wired or wireless network, a wired or wireless direct point-to-point connection, a software interface, a data channel or other communication mechanisms as will be apparent to those skilled in the art. Examples of such entities are described above including network connected IoT devices and the like. Notably, the type, nature, configuration or arrangement of the sender 202 and receiver 204 entities need not be similar or consistent between the entities such that disparate entities could be used.

The sender 202 includes a message 200 storing data therein and for communication to the receiver 204. In particular, embodiments of the present disclosure provide for communication of the message 200 to the receiver 204 while providing an impediment to third party, unauthorized or other entities accessing data stored in the message 200 by obfuscating the message 200 in a manner that the data can be readily reconstituted by the receiver 204. By providing an impediment through obfuscation, the resource burden of encryption is not required at either the sender 202 or receiver 204.

FIG. 2 provides a high-level overview of an embodiment of the present disclosure that will be considered in more detail with reference to FIGS. 3 to 6 below. Referring to FIG. 2, the sender 202 splits the message 200 into multiple message blocks 206 $B_1$ to $B_6$ suitable for rearranging to form an obfuscated version of the message 200. A proper order of the blocks 206 is encoded in a series of encoded indications 208. The proper order is an order of the blocks 206 required to constitute the message 200 so that data in the message 200 can be accessed—i.e. the message is not obfuscated when the blocks 206 are arranged in the proper order. An encoded indication 208 is provided for each block in the message blocks 206. Each encoded indication 208 indicates a position of a message block in the proper order in a manner that is reversibly encoded. Embodiments of the present disclosure reversibly encode a position indication for a message block based on at least a hash value evaluated for the message block and a secret that is shared between the sender 202 and receiver 204. The reversibility of the encoding can be achieved, for example, using an exclusive OR (XOR) operation of parameters such as an XOR of a hash value for a block and an indication of a proper position, p, of the block. The hash value of the block can be a hash value of a data content B of the block combined with the shared secret S, such combination being achieved, for example, by a logical OR operation. Thus, using a hashing function H:

$$\text{Encoded Indication (EI)} = H(B\|S) \oplus p$$

In this way, the proper position p for a block B can be recovered by reversing the encoding, provided the shared secret S is known, thus:

$$p = H(B\|S) \oplus \text{EI}$$

The sender 202 reorders the blocks into a new order of blocks 210 that is different to the proper order. For example, the sender 202 can reorder the blocks 210 into a random order provided the random order is not the proper order. Further, the sender 202 can analyze the new order of blocks 210 to verify it is sufficiently different to the proper order that the message cannot be readily inferred from even the reordered blocks 210. Such analysis can include, for example, determining a proportion of message blocks 206 that are adjacent other message blocks in the proper order and remain so collocated in the reordered blocks 210. Other mechanisms for ensuring sufficient reordering of the message blocks 206 will be apparent to those skilled in the art.

The reordered message blocks 210 and encoded indications 208 are communicated for receipt by the receiver entity 204. The receiver entity decodes the encoded indications 208 by reversing the encoding to determine a position in the proper order for each received block 210. Subsequently, the received blocks 210 can be reordered to the proper order 206 to reconstitute the message 200.

Figure 3:
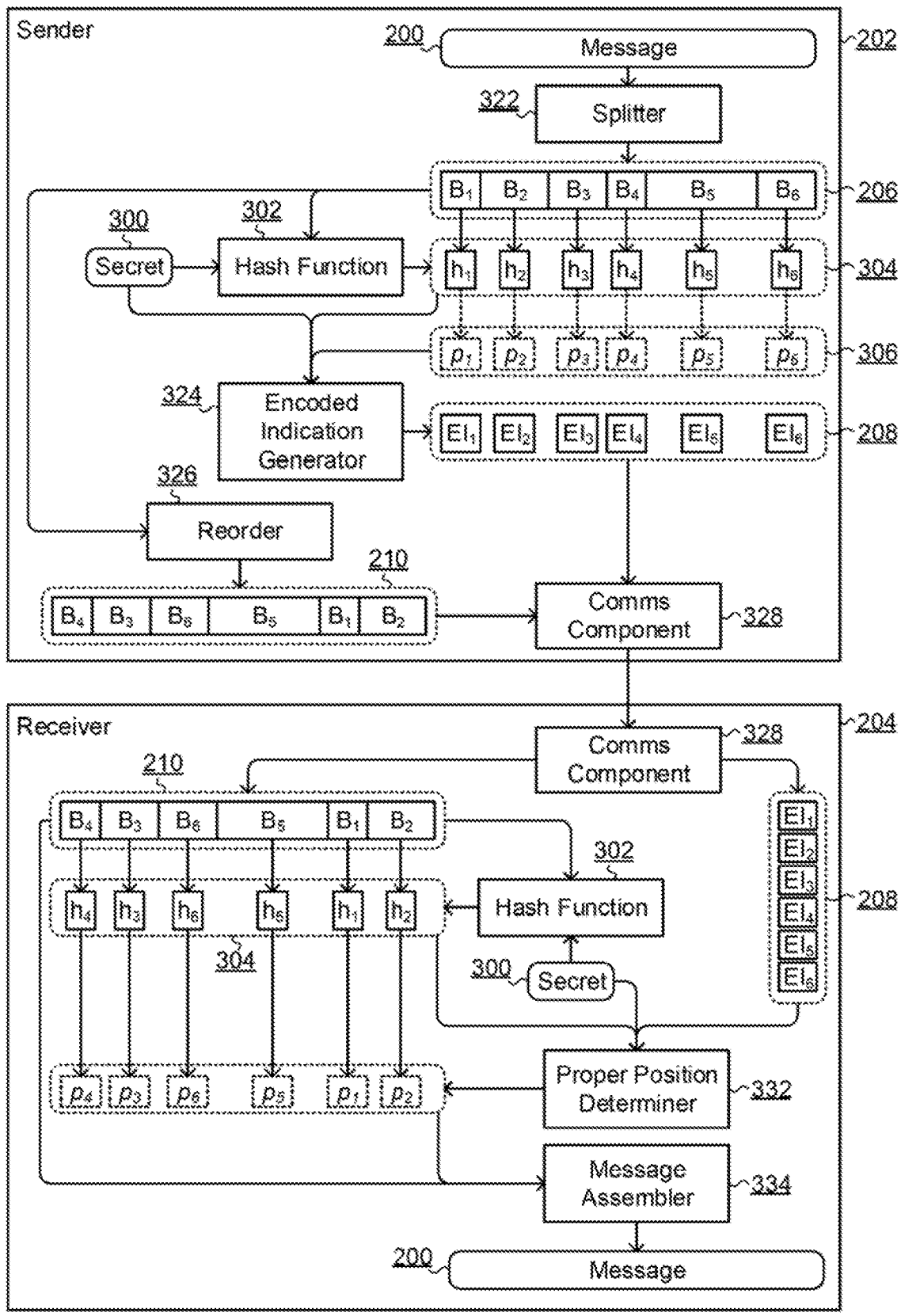
FIG. 3 is a component diagram elaborating that of FIG. 2 depicting an arrangement of sender and receiver entities for the communication of a message therebetween in accordance with embodiments of the present disclosure.

FIG. 3 is a component diagram elaborating that of FIG. 2 depicting an arrangement of sender 202 and receiver 204 entities for the communication of a message 200 therebetween in accordance with embodiments of the present disclosure. FIG. 3 has features in common with those already described with respect to FIG. 2. FIG. 3 includes a splitter component 322 as a hardware, software, firmware or combination component adapted to split the message 200 into message blocks 206 $B_1$ to $B_6$. The message blocks can be fixed or varying size and the particular selection of blocks can be determined based on, for example, an assessment of the sensitivity of data stored in a particular part of the message 200. For example, a message with mainly non-sensitive information and having a number of particularly sensitive parts can be split such that the sensitive parts are stored in smaller blocks as compared to the non-sensitive parts. The message blocks 206 are used to evaluate hash values 305 $h_1$ to $h_6$, one per block. Each hash value is evaluated by a hash function 302 and is evaluated, for a block, on the basis of a combination of data in the block and the shared secret 300. The shared secret 300 can be a key, passphrase or other secret data item that is known to both the sender 202 and receiver 204. Most preferably the shared secret is kept secret such as by storing the shared secret in a protected, reserved or otherwise secure area of a memory of each of the sender 202 and receiver 204. Thus, each has value can be evaluated using a hash function 302 H on the basis of data in block $B_n$ and the shared secret 300 S as:

$$h_n = H(B_n\|S)$$

The relationship between a hash value $h_n$ and a block $B_n$ is such that, if the hash values are ordered according to the proper order of the blocks 206 as $h_1 \ldots h_i$, it is possible to determine a proper position $p_n$ of a block $B_n$ in the proper order by evaluating the hash value for the block $h_n$ (on the basis of the block data and the shared secret S) and comparing with the ordered list of hash values $h_1 \ldots h_i$. This constitutes a ready approach to determining the proper order $p_1 \ldots p_i$ as depicted in FIG. 3 as proper order 306. However, even more secure approaches to encoding the proper order are outlined below.

As illustrated in FIG. 3, the hash values 304 (ordered according to the proper order 306) and shared secret 300 are used by an encoded indication generator 324 to generate a set of encoded indications 208, each encoded indication $\text{EI}_n$ indicating a proper position $p_n$ of a message block $B_n$ in the proper order of message blocks. In a preferred embodiment, each encoded indication $\text{EI}_n$ is reversibly encoded by an exclusive OR (XOR) operation on a further hash value and a proper position $p_n$ for a block $B_n$. The further hash value is a hash of the already evaluated hash value $h_n$ for the block $B_n$ further combined with the secret 300. Thus, according to the preferred embodiment, an encoded indication $\text{EI}_n$ can be expressed as:

$$\text{EI}_n = H(h_n\|S) \oplus p_n$$

In this way, decoding the position $p_n$ for a block $B_n$ can be achieved by:

$$p_n = H(h_n\|S) \oplus \text{EI}_n$$

or, for completeness:

$$p_n = H(H(B_n\|S)\|S) \oplus \text{EI}_n$$

Such nested hashing providing increased security of the encoding and offering further benefits as will be described below with respect to embodiments of FIG. 4, while remaining reversible.

Returning to FIG. 3, the message blocks 206 are subsequently reordered by the sender 202 using a reorder function or facility 326. Such reordering can take place, for example, as previously described with respect to FIG. 2, to arrive at a reordered set of message blocks 210. The message blocks in the new order (reordered) and the set of encoded indications 208 are then communicated to the receiver 204 via communications components 328 at each of the sender 202 and receiver 204. For example, the communications component 328 can provide wired or wireless network or point-to-point communications between the sender 202 and receiver 204.

Turning now to the operation of the receiver 204 in FIG. 3, the receiver 204 receives the message blocks 210 in the new order (i.e. not the proper order) and the encoded indications 208. The receiver 208 determines the proper position $p_n$ for each block $B_n$ based on an encoded indication $\text{EI}_n$ using a proper position determiner 332 as a hardware, software, firmware or combination component. The proper position determiner 332 decodes each $\text{EI}_n$ using the hash function 302 and shared secret 300 to determine the proper position $p_n$ for each block $B_n$, such as using the expressions provided above. Subsequently, a message assembler component 334 reorders the message blocks 210 into the proper order so as to reconstitute the original message 200 at the receiver 204.

Figure 4:
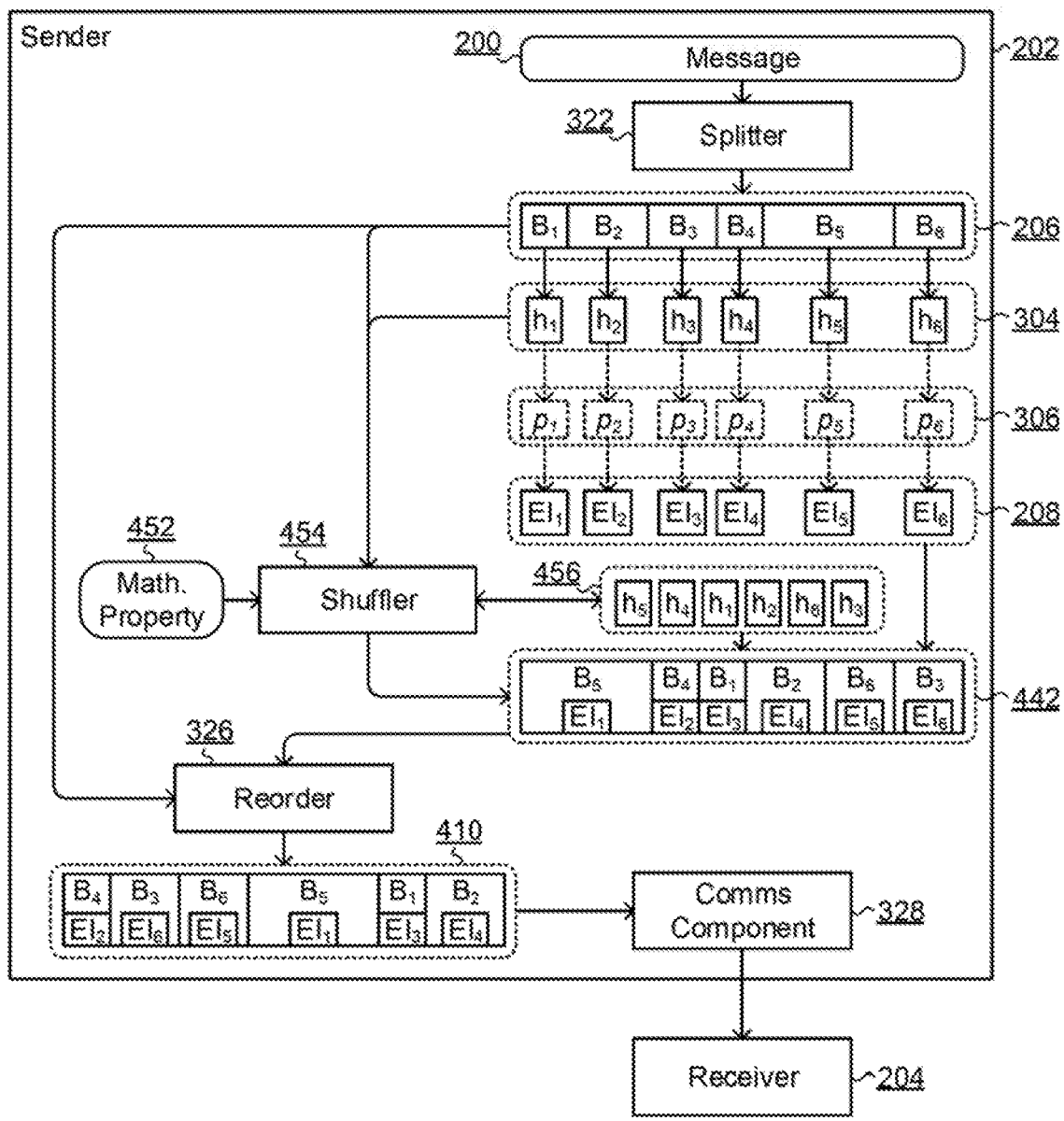
FIG. 4 is a component diagram of a sender entity according to a preferred embodiment of the present disclosure.

FIG. 4 is a component diagram of a sender entity 202 according to one embodiment of the present disclosure in which additional security is provided to reduce a prospect of malicious, unauthorized or unintended decoding of the encoded indications 208 that would render the message 200 vulnerable to unauthorized or undesired access. Many of the elements of FIG. 4 are identical to those described above with respect to FIGS. 2 and 3 and these will not be repeated here. Additionally, FIG. 4 depicts an enhanced mechanism for communicating the encoded indications 208 in a manner that protects against their exposure. The sender 202 of FIG. 4 further includes a shuffler component 454 as a hardware, software, firmware or combination component adapted to shuffle the message blocks $B_1 \ldots B_i$ of the message 200 according to a mathematical property 452 that is shared between the sender 202 and the receiver 204. For example, according to a preferred embodiment, the shuffler 454 forms a shuffled version of the message by rearranging message blocks $B_1 \ldots B_i$ based on values of hashes $h_1 \ldots h_i$, where the mathematical property 452 defines how the blocks are shuffled based on the hash values $h_1 \ldots h_i$. In one exemplary embodiment, the mathematical property 452 is "no decreasing order" in order to shuffle the message blocks $B_1 \ldots B_i$ according to an increasing order of the hash values $h_1 \ldots h_i$ corresponding to the message blocks. Alternative mathematical properties will be apparent to those skilled in the art. Thus, the hash values $h_1 \ldots h_i$ are ordered 456 according to the mathematical property 452, and the blocks $B_1 \ldots B_i$ are similarly so ordered to constitute a shuffled version 442 of the message 200.

Further, the shuffled version 442 of the message is used to communicate the encoded indications $EI_1 \ldots EI_i$ to the receiver 204. In an exemplary embodiment, the encoded indications $EI_1 \ldots EI_i$ are spread across the blocks $B_1 \ldots B_i$ as shuffled in the shuffled version 442. Notably, the order of the encoded indications as they are spread across the shuffled message blocks is the proper order so that, if the receiver 204 is able to reconstitute the shuffled message 422, it is also able to determine the proper order of the encoded indications 208 and ultimately the proper order of the message blocks $B_1 \ldots B_i$.

In the exemplary embodiment, the encoded indications 208 as spread across the shuffled message blocks 442. This provides a mechanism for securely communicating the encoded indications 208 to the receiver 204 by including, associating or referencing an encoded indication with a message block as communicated to the receiver 204. It is emphasized that, in this exemplary embodiment, the order of the encoded indications 208 as they are spread across the blocks in the shuffled message 442 is the proper order, though the order of the blocks in the shuffled message 442 is not necessarily (and in some embodiments is not) the proper order and is instead defined on the basis of the mathematical property 452 and the hash values $h_1 \ldots h_i$ for the blocks $B_1 \ldots B_i$. Furthermore, it is emphasized that the order of the blocks in the shuffled message 442 is not necessarily (and preferably is not) the same as the reordered message blocks 410 as defined by the reorder component 326, such reordered message blocks 410 being, in one exemplary embodiment, a random order of message blocks. Thus, the challenge for the receiver to generate the shuffled message 442 in order to determine a correct order of the encoded indications 208 is additional to the existing challenge of then decoding the encoded indications 208 to determine the proper order of the message blocks 206 to reconstitute the message 200.

Figure 5:
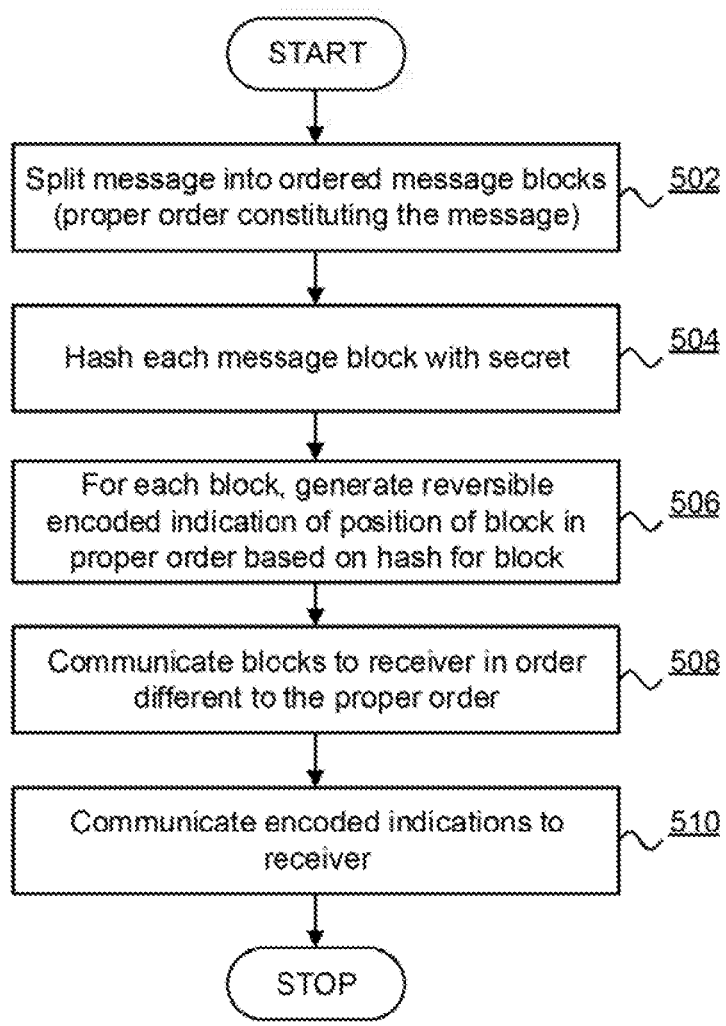
FIG. 5 is a method of a sender entity for protecting data in a message for communication from the sender to a receiver entity.

FIG. 5 is a method of a sender entity 202 for protecting data in a message 200 for communication from the sender 202 to a receiver 204 entity. Initially, at 502, the method splits the message 200 into a plurality of ordered message blocks 206, the order being a proper order such that an aggregation of the blocks in the proper order constitutes the message 200. At 504 the method generates a hash value for each message block, each hash value being generated on the basis of at least a content of the block and a shared secret 300. At 506 the method generates, for each block, an encoded indication 208 of a position 306 of the block in the proper order of blocks, the encoding being reversible and based on at least the hash value for the block and a position of the block in the proper order. At 508 the method communicates the blocks to the receiver in an order different to the proper order so as to obfuscate the message. At 510 the method communicates the encoded indications to the receiver such that the blocks can be reassembled by the receiver in the proper order on the basis of the shared secret. Notably, the communications at 508 and 510 can be combined according to the exemplary shuffling embodiments described with respect to FIG. 4.

FIG. 6 is a method of a receiver entity 204 for protecting data in a message 200 for communication from a sender 202 to the receiver entity 204. Initially, at 602, the method receives the message 200 obfuscated as a plurality of message blocks 210 such that an aggregation of the blocks 210 in a proper order constitutes the message 200. Notably, the message blocks are received in an order different to the proper order. At 604 the method receives, for each block, an encoded indication of a position of the block in the proper order. The encoding of the indication is reversible and based on at least a hash value for the block and the shared secret and a position of the block in the proper order. Notably, the receiving of blocks and encoded indications at 602 and 604 can be combined according to the exemplary shuffling embodiments described with respect to FIG. 4. At 606 the method generates a hash value for each message block, each hash value being generated on the basis of at least a content of the block and the secret. At 608 the method decodes each encoded indication using the hash value and the secret to determine the proper order of the blocks. At 610 the method assembles the message 200 from the blocks on the basis of the determined proper order.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of protecting data in a message for communication from a sender to a receiver, the sender and receiver sharing a secret, the method comprising:
   splitting the message into a plurality of ordered message blocks based on an assessment of the sensitivity of data stored in the message, wherein an order of the message blocks is a proper order such that an aggregation of the message blocks in the proper order constitutes the message;
   generating a hash value for each message block, each hash value being generated based on at least a content of the message block and the secret;
   generating, for each message block, an encoded indication of a position of the message block in the proper order of the message blocks, wherein the encoded indication is reversible, wherein the encoded indication is calculated from a hashing function of at least the hash value for the message block and a position of the message block in the proper order;
   communicating the message blocks to the receiver in an order different from the proper order so as to obfuscate the message; and
   communicating the encoded indications to the receiver such that the message blocks can be reassembled by the receiver in the proper order based on the shared secret.

2. The method of claim 1, further comprising:
   reordering the message blocks to constitute a shuffled message, the reordering being performed based on a mathematical property of the hash values, the mathematical property being shared between the sender and the receiver,
   wherein communicating the encoded indications to the receiver includes spreading the encoded indications across the message blocks in the shuffled message such that communicating the message blocks to the receiver includes communicating the encoded indications to the receiver, and such that the encoded indications are extractable by the receiver by a reassembly of the shuffled message using the mathematical property to determine the proper order of the message blocks.

3. The method of claim 1, wherein each of the encoded indications is reversible based on the shared secret by an exclusive-OR operation of the encoded indication and a hash of a value based on the shared secret.

4. The method of claim 2, wherein the encoded indications are communicated by aggregating an indication to each of the message blocks as communicated.

5. A computer implemented method of protecting data in a message communicated from a sender to a receiver, the sender and receiver sharing a secret, the method comprising:
   receiving the message as a plurality of message blocks such that an aggregation of the message blocks in a proper order constitutes the message, wherein the message blocks are received in an order different from the proper order, wherein the message was split into the message blocks based on an assessment of the sensitivity of data stored in the message;
   receiving an encoded indication for each message block of a position of the message block in the proper order, wherein the encoded indication is reversible, and based on wherein the encoded indication is calculated from a hashing function of at least a hash value for the message block and the shared secret and a position of the message block in the proper order;
   reconstituting the message by determining the proper order of the message blocks by:
      generating a hash value for each message block, wherein each hash value is generated based on at least a content of the message block and the secret; and
      determining the proper order of the message blocks by decoding each of the encoded indications based on the hash value for each message block and the secret so as to reconstitute the message.

6. The method of claim 5, further comprising:
   assembling a shuffled version of the message by ordering the message blocks based on a mathematical property of the hash values, the property being shared between the sender and the receiver, and
   wherein receiving the encoded indications includes extracting each of the encoded indications from the message blocks in an order according to the order of the message blocks in the shuffled message, a position of an encoded indication in the ordered indications serving to identify a message block associated with the encoded indication for hashing in order to retrieve the position of the message block from the encoded indication in the proper order.

7. The method of claim 5, wherein each of the encoded indications is reversible based on the shared secret by an exclusive-OR operation of the encoded indication and a hash of a value based on the shared secret.

8. A computer system comprising:
   a processor and memory storing computer program code for protecting data in a message for communication from a sender to a receiver, the sender and receiver sharing a secret, by:
      splitting the message into a plurality of ordered message blocks based on an assessment of the sensitivity of data stored in the message, wherein an order of the message blocks is a proper order such that an aggregation of the message blocks in the proper order constitutes the message;
      generating a hash value for each message block, each hash value being generated based on at least a content of the message block and the secret;
      generating, for each message block, an encoded indication of a position of the message block in the proper order of the message blocks, wherein the encoded indication is reversible, wherein the encoded indication is calculated from a hashing function of at least the hash value for the message block and a position of the message block in the proper order;

communicating the message blocks to the receiver in an order different from the proper order so as to obfuscate the message; and communicating the encoded indications to the receiver such that the message blocks can be reassembled by the receiver in the proper order based on the shared secret.

9. A non-transitory computer-readable storage medium storing a computer program element comprising computer program code to, when loaded into a computer system and executed thereon, cause the computer system to protect data in a message for communication from a sender to a receiver, the sender and the receiver sharing a secret, by:

splitting the message into a plurality of ordered message blocks based on an assessment of the sensitivity of data stored in the message, wherein an order of the message blocks is a proper order such that an aggregation of the message blocks in the proper order constitutes the message;

generating a hash value for each message block, each hash value being generated based on at least a content of the message block and the secret;

generating, for each message block, an encoded indication of a position of the message block in the proper order of the message blocks, wherein the encoded indication is reversible, wherein the encoded indication is calculated from a hashing function of at least the hash value for the message block and a position of the message block in the proper order;

communicating the message blocks to the receiver in an order different from the proper order so as to obfuscate the message; and communicating the encoded indications to the receiver such that the message blocks can be reassembled by the receiver in the proper order based on the shared secret.

* * * * *